F. R. DICKEY.
RUNNER ATTACHMENT FOR VEHICLES.
APPLICATION FILED JULY 29, 1912.

1,047,767.

Patented Dec. 17, 1912.

2 SHEETS—SHEET 1.

WITNESSES

INVENTOR
F. R. Dickey.

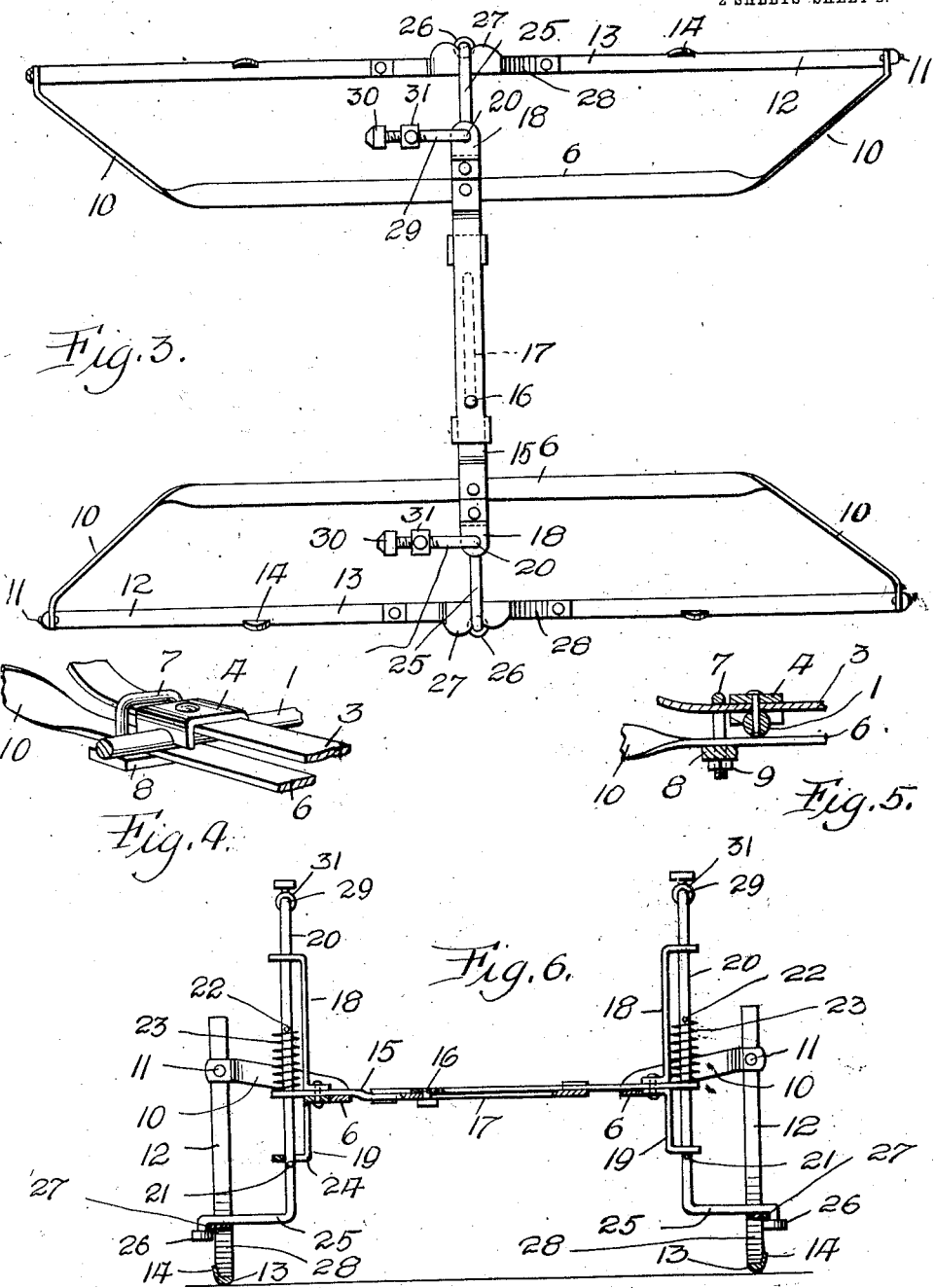

UNITED STATES PATENT OFFICE.

FREDERICK R. DICKEY, OF BUTLER, PENNSYLVANIA.

RUNNER ATTACHMENT FOR VEHICLES.

1,047,767.  Specification of Letters Patent.  Patented Dec. 17, 1912.

Application filed July 29, 1912. Serial No. 712,031.

*To all whom it may concern:*

Be it known that I, FREDERICK R. DICKEY, a citizen of the United States of America, residing at Butler, in the county of Butler and State of Pennsylvania, have invented certain new and useful Improvements in Runner Attachments for Vehicles, of which the following is a specification, reference being had therein to the accompanying drawings.

This invention relates to runner attachments for baby carriages, go-carts and other vehicles, and the primary object of my invention is to provide a runner attachment by which a baby carriage can be easily and quickly converted into a sled and as readily form a sled to a baby carriage.

Another object of this invention is to provide a runner attachment for vehicles that will permit of the vehicle being easily moved over snow and frozen surfaces.

A further object of this invention is to provide a runner attachment that is applicable to various types of vehicles without requiring any changes or modifications of the vehicle.

A still further object of this invention is to furnish a baby carriage with shiftable runners that are inexpensive to manufacture, durable and highly efficient for the purposes for which they are intended.

With the above and other objects in view the invention resides in a novel construction, combination and arrangement of parts to be hereinafter specifically described and then claimed.

Reference will now be had to the drawings, wherein like numerals denote corresponding parts throughout the several views, in which:—

Figure 1:
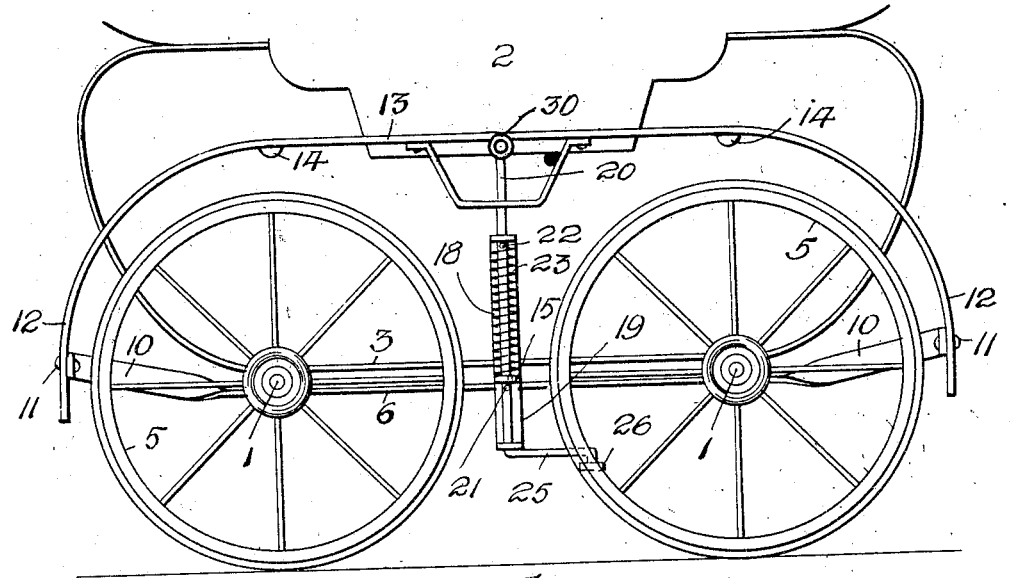
Figure 2:
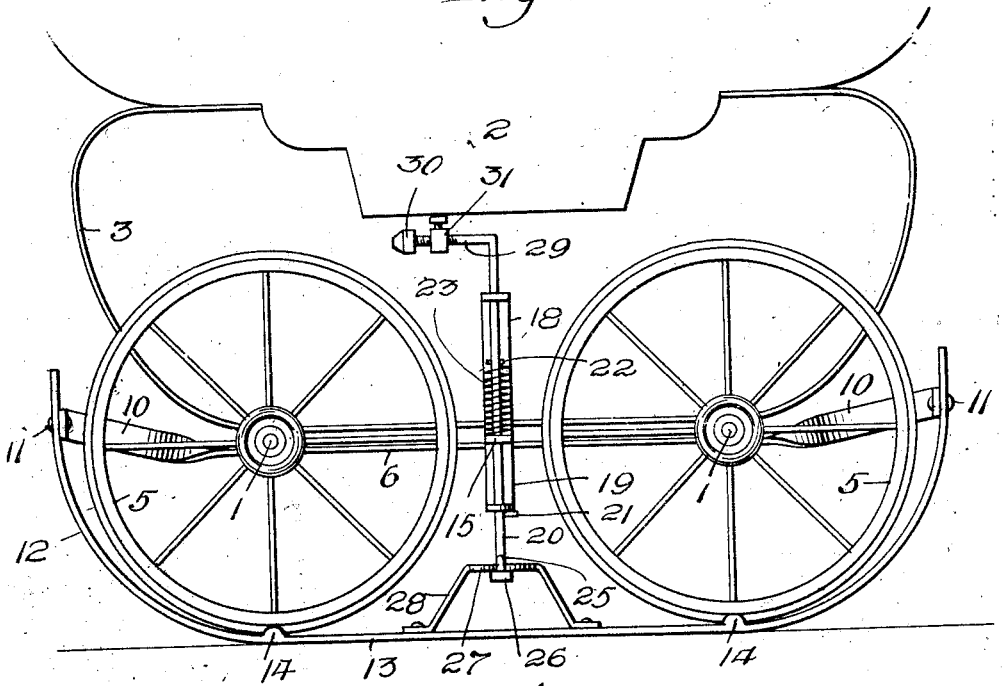

Figure 1 is a side elevation of a portion of the baby carriage provided with the runner attachment and showing the same in an inactive position above the wheels of the baby carriage, Fig. 2 is a similar view showing the runner attachment swung into an active position beneath the wheels of the carriage, Fig. 3 is a plan of the runner attachment, Fig. 4 is a perspective view of a portion of the same illustrating the fastener employed for connecting the attachment to a carriage, Fig. 5 is a longitudinal sectional view of the fastener, and Fig. 6 is a cross sectional view of the attachment.

The reference numerals 1 denote the axles of a baby carriage 2 that are supported by springs 3 connected to the axles by clips 4. The ends of the axles are provided with ordinary wheels 5.

Secured to the springs 3 adjacent to the clips 4 are longitudinal frames 6 that are fastened to the springs 3 by yokes 7, bars 8 and nuts 9. The frames 6 are arranged in parallelism and the ends thereof are twisted or bent, as at 10 to a point in proximity to the tires or rims of the wheels 5, as best shown in Figs. 1 and 2. Pivotally connected to the ends of the frames 6 by pins 11 are the curved ends 12 of runners 13, said runners being semi-cylindrical with the flat sides thereof confronting the wheels 5. The runners 13 have side lugs 14 that engage the outer sides of the wheels 5 and limit the inward movement of said runners, as best shown in Fig. 2.

The frames 6, intermediate the ends thereof, support a sectional adjustable transverse connecting bar 15, this bar having the sections thereof connected together by a pin 16 that slides in a slot 17 formed in one of the sections of the bar. It is through the medium of this adjustable connecting bar that the runner attachment can be applied to carriages and vehicles of various widths.

The ends of the connecting bar 15 protrude from the frames 6 and support vertical guide bearings 18 and 19 for a locking rod 20 that is slidably mounted in an opening provided therefor at the end of the bar 15. The locking rod has transverse pins 21 and 22 and encircling said rod between the pin 22 and the end of the bar 15 is a coiled compression spring 23 that retains said rod in a normally elongated position. The bearing 19 has a longitudinal slot 24 (see left-hand side of Fig. 6) and the pin 21 slides in said slot as the locking rod is lowered. By then rotating the rod a quarter of a revolution, the pin 21 can be swung under the bearing 19 to lock the rod in a lowered position.

The lower end of the locking rod 20 has a crank 25 provided with a head 26 and said head is adapted to swing into engagement with and extend under the top 27 of a bracket 28 secured to each runner, intermediate the ends thereof. The top of the bracket is notched and with the head 26 in engagement therewith, the runner is retained in engagement with the wheels of a baby carriage and prevented from becoming accidentally displaced.

The upper end of the locking rod has a crank 29, a beveled head 30 and an adjustable locking nut 31. When the runner is swung to an inactive position above the wheels the runner rides over the beveled head 30 and engages between said head and the nut 31. The runner is then held and cannot become accidentally displaced while the baby carriage is in use.

The attachment in its entirety can be made of light and durable metal and finished to harmonize with the metallic fittings of the baby carriage and while in the drawings there is illustrated a preferred embodiment of my invention, it is to be understood that the structural elements are susceptible to such variations and modifications as fall within the scope of the appended claims.

What I claim is:—

1. In a runner attachment for vehicles, the combination with the wheels of a vehicle, of longitudinal parallel frames supported by the vehicle in proximity to said wheels, runners having curved ends thereof pivotally connected to said frames whereby said runners can be swung under said wheels and above said wheels, an adjustable connecting bar connecting said frames, and means carried by the ends of said bar for locking said runners in adjusted position relatively to said wheels.

2. In a runner attachment for vehicles, the combination with the wheels of a vehicle, of longitudinal parallel frames supported by the vehicle in proximity to said wheels, runners having curved ends thereof pivotally connected to said frames whereby said runners can be swung under said wheels and above said wheels, an adjustable connecting bar connecting said frames, and means carried by the ends of said bar for locking said runners in adjusted position relatively to said wheels, said means including bearings, locking rods and brackets.

In testimony whereof I affix my signature in the presence of two witnesses.

FREDERICK R. DICKEY.

Witnesses:
 CHAS. L. HAUPT,
 S. K. CLARKE.